June 8, 1943.  R. BIRCHER  2,321,561
SKI MECHANISM FOR AIRCRAFT
Filed June 15, 1940  2 Sheets-Sheet 1

WITNESSES:
Thomas W. Kerr, Jr.
Woodrow Stevenson

INVENTOR:
Richard Bircher,
BY Paul Paul
ATTORNEYS.

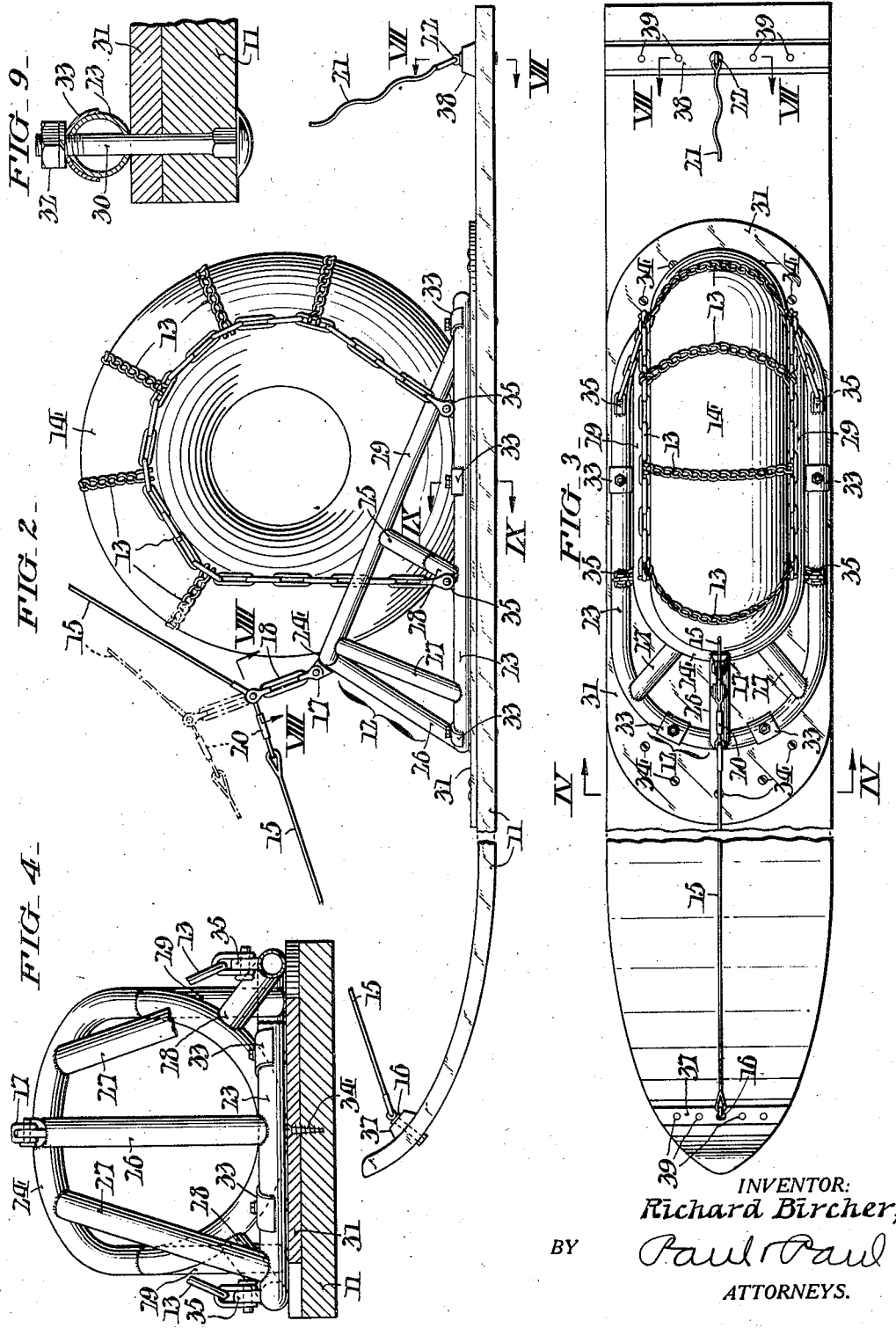

Patented June 8, 1943

2,321,561

UNITED STATES PATENT OFFICE 2,321,561

SKI MECHANISM FOR AIRCRAFT

Richard Bircher, Philadelphia, Pa., assignor to Aeronautic Sales & Service, Inc., Philadelphia, Pa., a corporation of Pennsylvania Application June 15, 1940, Serial No. 340,687

6 Claims. (Cl. 280—13)

This invention relates generally to a ski mechanism for aircraft and more specifically to aircraft landing skis which are capable of attachment to the wheels of an aircraft.

The general idea of providing a ski mechanism in the form of a self-contained unit for attachment to the wheels of vehicles other than aircraft is old. However, prior ski mechanisms of this type have been found to be impractical for use in connection with aircraft, due principally to the difference in forces involved in the use of aircraft as compared to the forces encountered in the use of ski mechanisms on vehicles other than aircraft, there being a downward motion, a forward motion, and a tendency toward sideward motion in the case of aircraft. It will thus be seen that the sudden stresses and strains to which an aircraft ski mechanism is subjected during landing or taking off are peculiar to aircraft.

Therefore modifications of the types of ski mechanism existing in the prior art in connection with land vehicles have failed to accommodate the forces involved in the use of aircraft. This problem has been recognized generally by the art relating to aircraft landing gear in its development and a number of efforts have been made to solve the problem by providing skis for attachment to aircraft after removal of the usual aircraft wheels. This has been only partially successful and has introduced disadvantages in connection with the removal of the aircraft wheels and the attachment of other devices directly to the axle. Such an operation entails considerable time and equipment.

The main object and advantage of this invention, therefore, is the provision of a ski mechanism or unit which may be attached directly to the wheel of an aircraft and which, though light in weight, is sufficiently strong to withstand the forces encountered in aircraft operation without structural failure. Another object of this invention is the provision of an aircraft ski which is of simplified constructon and inexpensve to manufacture. Another object of this invention is the provision of an aircraft ski mechanism which is scientifically designed to dissipate the sudden shocks incident to the landing and taking off of aircraft with avoidance of concentrated strains in localized areas likely to cause structural failures. Other objects and advantages of this invention will become apparent from the following detailed description of a preferred embodiment of the invention which is illustrated in the accompanying drawings.

Fig. 1 of the drawings shows a side view of an airplane equipped with the ski mechanism of this invention.

Fig. 2 is a side view of an aircraft ski embodying this invention, showing the manner of its attachment to an aircraft wheel.

Fig. 3 is a plan view of the subject-matter shown in Fig. 2.

Fig. 4 is a section taken through the lines IV—IV of Fig. 3.

Fig. 9 is a partial transverse sectional view taken as indicated by the lines IX—IX of Fig. 2 to show the manner of anchoring the cradle component to the ski element.

In describing the preferred embodiment of this invention illustrated in the above mentioned drawings, specific terms will be employed for the sake of clarity, but it is to be understood that the scope of this invention is not thereby limited and each specific term so used shall be deemed to include all legal equivalents which perform substantially the same function in substantially the same manner.

Figure 1:
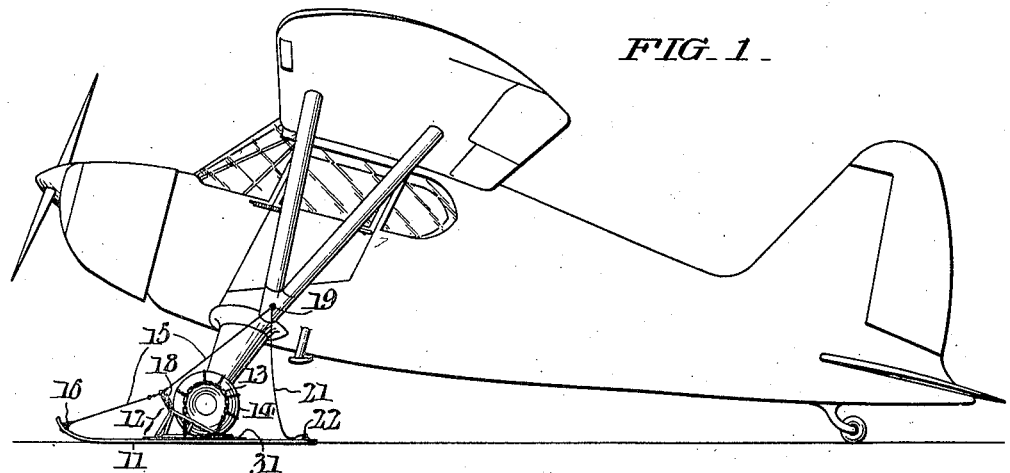

As one specific embodiment of a preferred form of the present invention, there is shown in the drawings a ski unit having the general form of a shoe with an elongated flat surfaced or ski component 11, a cradle-like rearwardly open cradle component 12 attached thereto, and a suspension harness 13 shackled to the eyes 35 which are attached to said component 12. The suspension means or harness 13 extends over and around the top of the wheel tire 14 which is shown seated in the cradle component 12 and as shown is constructed of interconnected crosswise and side chain sections which fasten securely around tire 14. However, other means such as cables for retaining tire 14 within component 12 may be used. It will be noted that the harness 13 at its forward end is positioned inside the cradle component 12. Adjustment means (not shown) may be provided for adapting harness 13 to tires of different sizes. A restraining means including a guy wire 15 is attached to the forward part of the ski 11 by means of anchor element 16 and to the cradle component 12 by means of anchor element 17 through the shock cord 18 which elongates to the position shown in dot-and-dash outline in Fig. 2 when guy wires 15 and 21 are attached to the aircraft and when the latter is on the ground. The upper end of guy wire 15 is attached to the aircraft at the anchorage point 19 as shown in Fig. 1. Turnbuckle 20 is provided to adjust the length of guy wire 15. The rear guy wire 21 of the restraining means is attached to the rear portion of ski 11 by anchorage means 22 and is also attached to the aircraft at anchorage point 19.

Figure 5:
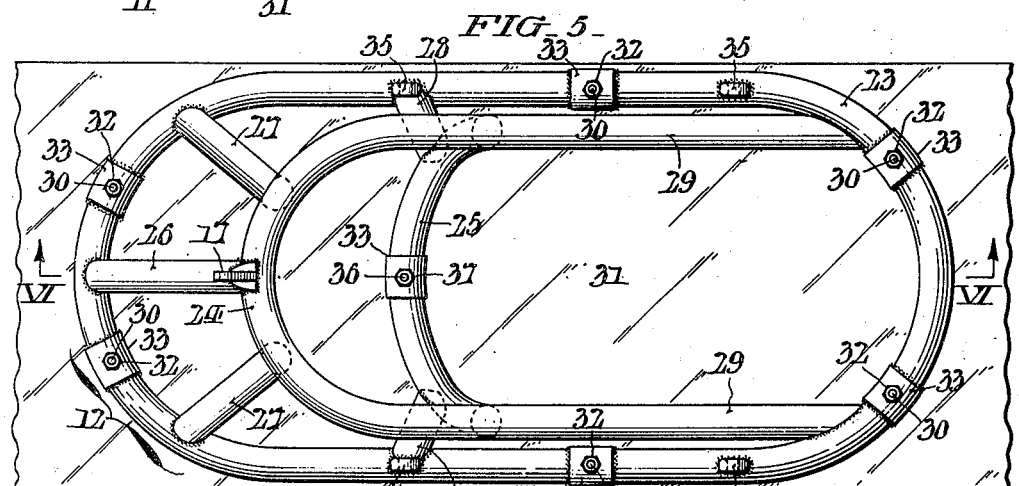
Fig. 5 is an enlarged plan view of the upper or cradle component of the aircraft ski mechanism illustrated in the above mentioned figures.
Figure 6:
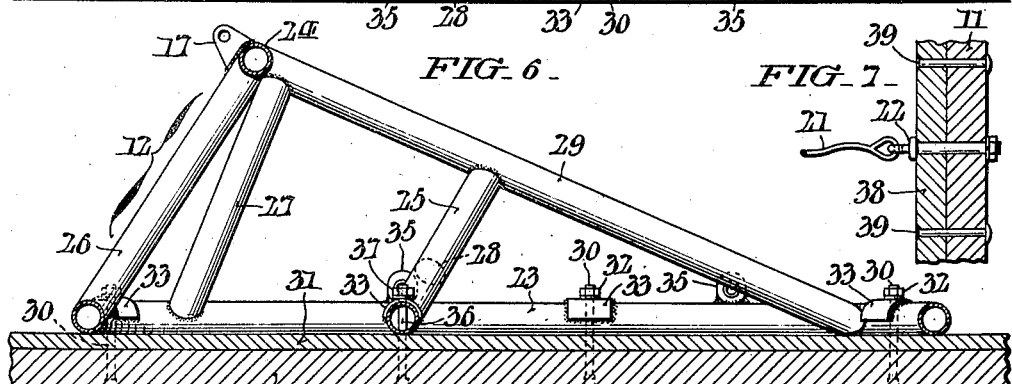
Fig. 6 is a longitudinal sectional view of the apparatus shown in Fig. 5 taken through the lines VI—VI thereof.
Figure 7:
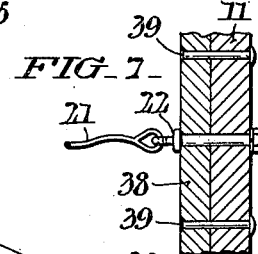
Fig. 7 is a partial transverse section taken as indicated by the lines VII—VII of Figs. 2 and 3.
Figure 8:
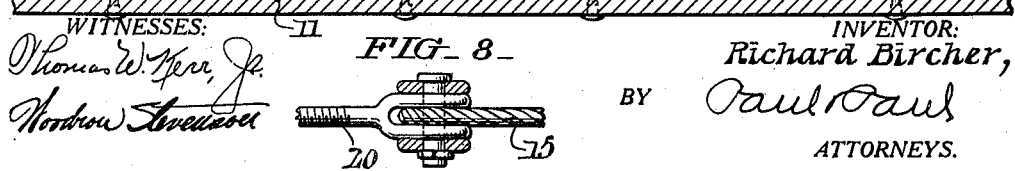
Fig. 8 is a section taken through the lines VIII—VIII of Fig. 2 showing the manner of attachment of the guy wires to a link attached to the front portion of the cradle component.

As shown in Figs. 5 and 6, cradle component 12 has a force collecting bottom edge or base portion 23 in the form of elongated straight-sided ellipse with semi-circular ends, which is considerably wider than the wheel tire; a U-shaped upper edge portion of a width to snugly receive the tire between its sides, declining rearwardly below the wheel center, whereof the front end is rounded as at 24 for engagement by the front of the tire periphery at an elevation above the top surface of the ski component; and a plurality of spaced thrust-resisting members in the form of struts 25, 26, 27 and 28 arranged at intervals around the front and along the sides of the cradle. The thrust or shock-resisting member 25, it will be observed from Fig. 4, U-shaped and disposed in a forwardly declining transverse plane which passes substantially through the wheel axis, being secured centrally of its bottom to the ski component 11 by means of a bolt 36 which is held by a nut 37, see Figs. 5 and 6. From Fig. 4 it will be further noted that the struts 28 extend laterally outward at declining angles between the sides of shock resisting member 25 and the bottom edge portion or base 23 of the cradle. The struts 26 and 27, on the other hand, slope downwardly and outwardly between the top and bottom edge portions, 29, 23 of the cradle, being set substantially radially to the rounded front ends of said edge portions. For the sake of lightness and rigidity, the several parts which enter into the construction of the cradle are all formed from relatively stout tubular material, and are permanently welded together at the regions of mutual abutment.

The cradle 12 is attached to ski 11 by means of carriage bolts 30 which pass upwardly through ski 11 and reinforcing element 31 and through the base 23, being fastened securely by nuts 32 with the usual washers. Reinforcing elements 33, shown in detail in Fig. 9, are provided to prevent distortion of the tubular member making up the base 23. Reinforcing element 31, preferably glued to ski 11, is also attached thereto by means of screws 34. Reinforcing strips 37 and 38 are attached to the toe and heel, respectively, of the ski 11 by means of peened rivets 39.

When it is desired to use the ski mechanism of the present invention, the aircraft is simply rolled into the cradle component 12 (one such component being provided for each wheel) so that the tire 14 is in contact with the curved surfaces of forward retaining element 24 and shock dissipating element 25. Harness 13 is then securely fastened around the tire 14, guy wires 15 and 21 are attached to the aircraft at the anchorage point 19, and turnbuckle 20 is adjusted to give the desired elongation of shock cord 18. The aircraft is thus ready for flight within a very few minutes from the time at which it is rolled into the cradle component 12.

As soon as the aircraft leaves the ground, shock cord 18 contracts and in so doing draws the forward portion of the ski 11 upwardly until the downward motion of the heel of ski 11 is arrested by the taking up of the slack in the guy wire 21. When the aircraft is landed, the back portion of the ski 11 is therefore normally the first part to make contact with the ground, thus preventing any tendency of the forward portion of the ski to bury itself. However, the weight of the aircraft very quickly forces the ski into the position shown in Fig. 1 with shock cord 18 stretched to the position shown in dot-and-dash lines in Fig. 2, and the principal shock forces are then scientifically distributed with the ski 11 in this position.

In the landing of an aircraft there are three principal forces which a ski mechanism must withstand. These are the forces derived from the downward motion of the aircraft, from the forward motion of the aircraft relative to the ground, and from the tendency toward sideward motion after the aircraft has made contact with the ground. This latter force is particularly strong if the aircraft is landed while drifting or where a ground loop develops. The proper dissipation of all of these forces is provided for in the ski mechanism of the present invention.

It will be seen that the aircraft tire 14 makes contact with the ski mechanism of the present invention at three separate places, exclusive of the points of contact with the harness 13. There is contact with the ski reinforcing element 31 at a point on the vertical line extending through the wheel center. There is contact of the lower portion of the wheel with the shock dissipating element 25 along a curved line substantially forward of a vertical line extending through the wheel center, and there is a third contact of the forward portion of the wheel along the curved portion of the forward retaining element 24. A large proportion of the forces encountered is received in the first instance by the forward retaining element 24 and the shock dissipating element 25. Forward collapse of the cradle component 12 is primarily prevented by forward retaining element 24 in conjunction with force transmitting elements 26 and 27 although shock dissipating element 25 together with its force transmitting elements 28 coacts with forward retaining element 24 in preventing forward collapse. Sideward collapse of the cradle component 12 is prevented primarily by shock dissipating element 25 together with its force transmitting elements 28 which act as buttresses. A forward, downward, and sideward inclination of force transmitting elements 27 and 28 make possible a very effective dissipation of all of the forces involved into a common ring or base 23. As shown in Fig. 5, base 23 has attached to it all of the other members of cradle 12. In addition, shock dissipating element 25 is attached at its lowest point to ski 11, thus providing a further point for receiving downward forces.

While the embodiment of the invention described in detail above constitutes a preferred form, it is to be understood that various modifications may be made within the scope of the invention. For instance, in place of the welded tube structure shown in the preferred form, a construction involving a casting could be used. It is also desirable in some cases to provide shield elements (not shown) to fill the spaces between force transmitting elements 26 and 27 in order to prevent undue packing of snow at these points.

Having thus described my invention, I claim:

1. A ski unit for use in association with the landing wheel of an aircraft or the like, having the form of a shoe with an elongate flat-surfaced bottom component or ski which contacts tangentially with the bottom of a resilient tire on the wheel, and a rearwardly-open attached U-shaped cradle component whereof the top edge portion is rounded at the front for contact at an elevation above the ski component with the tire periphery and declines rearwardly in contact with opposite sides of the tire below the wheel center, whereof the lower edge or shock-dissipating portion is substantially wider transversely than the tire and extends forwardly beyond the front of the upper edge portion, and whereof said upper and lower edge portions are joined by downwardly and outwardly sloping buttress means capable of resisting the forward and lateral thrusts encountered in taking-off or landing of the craft; means whereby the unit is supported from the wheel so as to pivot on the axis of the latter; and restraining means whereby the ski is held in substantially horizontal position with capacity for limited pivoted movement about the wheel axis during taking-off or landing.

2. A ski unit according to claim 1, in which the cradle component is braced intermediate the points of contact respectively of the upper edge portion and the ski bottom with the tire periphery, by a U-shaped member disposed in a forwardly declining plane and secured at its bottom end to the ski component.

3. A ski unit according to claim 1, in which the upper and lower edge portions of the cradle component are fashioned from tubular material; in which the upper edge portion is rigidly connected to the lower edge portion at the rear; and in which the buttress means comprises a plurality of inclined struts likewise of tubular material arranged in spaced relation around the front and along the sides of the cradle component and rigidly secured, top and bottom, to said upper and lower edge portions.

4. A ski unit according to claim 1, in which the upper and lower edge portions of the cradle component are fashioned from tubular material; in which the upper edge portion is rigidly connected to the lower edge portion at the rear; in which the buttress means comprises a plurality of inclined struts likewise of tubular material arranged in spaced relation around the front and along the sides of the cradle component and rigidly secured, top and bottom, to said upper and lower edge portions; and in which a forwardly declining downwardly curved bracing member likewise of tubular material has its ends rigidly secured to the top edge portions, and which is secured centrally of its bottom to the top surface of the ski component at a point forward of the wheel center.

5. A ski unit according to claim 1, in which the supporting means comprises a harness with a plurality of circumferentially spaced chain sections which extend crosswise over the top of the wheel periphery, and with a pair of side chains which extend around the sides of the wheel tire and which have their respective ends secured to longitudinally-spaced anchorages at the lower edge portion of the cradle component, and to which the opposite ends of the crosswise chains are connected.

6. A ski unit according to claim 1, in which the restraining means comprises a forwardly declining frontal guy wire with one end secured centrally of the front end of the ski and its other end secured to a fixed anchorage on a portion of the aircraft; an elastic shock-absorbing element secured at one end centrally of the front end of the top edge portion of the cradle component and its other end secured to the frontal guy wire at an intermediate point; and a rearwardly-declining guy wire connected at its upper end to the fixed anchorage aforesaid on the craft and having its lower end connected centrally of the rear end of the ski component of the unit.

RICHARD BIRCHER.